United States Patent [19]
Lytle et al.

[11] Patent Number: 5,957,332
[45] Date of Patent: Sep. 28, 1999

[54] AUTOMATIC DISPENSER FOR GRANULAR FOOD PRODUCTS

[76] Inventors: William F Lytle, 122 Ansonia Rd., Woodbridge, Conn. 06525; Frederick McKinney, 8 Windmill La., Trumbull, Conn. 06611

[21] Appl. No.: 08/872,677

[22] Filed: Jun. 11, 1997

[51] Int. Cl.[6] .................................................. B67D 5/08
[52] U.S. Cl. ............................................ 222/63; 222/368
[58] Field of Search .............................. 222/65, 66, 333, 222/368, 643, 650, 362

[56] References Cited

U.S. PATENT DOCUMENTS

| | | | |
|---|---|---|---|
| 1,165,907 | 12/1915 | Riddle | 222/368 |
| 2,489,498 | 11/1949 | Palmer | 222/66 |
| 2,566,210 | 8/1951 | Kendall et al. | 222/333 |
| 4,131,394 | 12/1978 | Sjoblom | 222/362 |

*Primary Examiner*—Andres Kashnikow
*Assistant Examiner*—Dinh Q. Nguyen
*Attorney, Agent, or Firm*—H. Gibner Lehmann; K. Gibner Lehmann

[57] ABSTRACT

A dispenser for granular food products comprises a hopper for holding a quantity of the product, a pair of back-to-back rotary buckets to alternately receive measured quantities of the product from the hopper, and a semi-automatic electric-powered drive for operating the buckets to discharge their contents seriatim into waiting containers or packages. The preferred embodiment utilizes a cam-switch controlled electric motor which is responsive to push-button triggering.

15 Claims, 2 Drawing Sheets

AUTOMATIC DISPENSER FOR GRANULAR FOOD PRODUCTS

BACKGROUND OF THE INVENTION

FIELD OF THE INVENTION

This invention relates to the dispensing of food particulates such as coffee beans and the like, and more particularly to the automatic, powered dispensing of such products, as adapted for venting machines found in stores and other public places.

In large food outlets it is presently customary to carry a number of different species and brands of foods. While many of these are prepackaged at the factory, some are distributed in bulk, and offered to the buying public through vending machines which meter out specific quantities, for packaging at the point of sale. Exotic coffees are an example of such practice.

The vending of different brands of coffee beans in measured quantities has not resulted in especially neat and convenient facilities, thereby leaving much room for improvement.

Accordingly one object of the present invention is to provide an especially simple and easy-to-operate automatic coffee bean dispenser adapted for use in modern high quality food stores.

Another object of the invention is to provide an improved coffee bean dispenser as above outlined, which is especially reliable and foolproof in its operation.

A further object of the invention is to provide an improved coffee bean dispenser in accordance with the above, which is "user friendly" to the extent that its operation is especially easy to understand for the average customer.

An additional object of the invention is to provide an improved coffee bean dispenser which is economical to fabricate and capable of low cost sales.

Still another object of the invention is to provide an improved coffee bean dispenser which can utilize components that are readily available in the marketplace.

Yet another object of the invention is to provide an improved coffee bean dispenser which is sanitary and capable of being easily cleaned.

A feature of the invention resides in a construction that enables the dispenser to be easily cleaned for use with another brand or with other granular material.

Other features of the invention reside in a construction which is quiet in its operation, compact and light in weight whereby it can be easily adapted to existing space accommodations.

Still another object of the invention is to provide an improved coffee bean dispenser which is dimensioned to enable a number of such units to be readily installed side by side while requiring a minimum of space.

Still other features and advantages will hereinafter appear.

In accomplishing the above objects the preferred embodiment of the invention provides a dispenser construction comprising a hopper having a bottom discharge opening and a dispensing chamber with a cylindrical interior, disposed below the discharge opening, such chamber having a bottom outlet to empty it contents into a waiting bag or package. In the dispensing chamber there is a novel zig-zag shaped partition blade that has a flat body portion with angularly, oppositely extended end portions, such blade being movable between two positions wherein spaces on its opposite sides can be alternately connected respectively with either the discharge opening of the hopper or else the bottom outlet of the dispensing chamber. The end portions of the blade have curvilinear exterior side surfaces which closely fit the cylindrical interior of the dispensing chamber. Electrical means comprising a motor having a cam-operated switch is utilized to drive the partition blade through half-revolutions, as triggered by a push button switch intended to be actuated by the user. When one space is emptying its metered contents into a waiting container another partitioned space is being refilled for discharge into a succeeding waiting package at the same time. Each one-time actuation of the push-button switch acts like a trigger to initiate a fully automatic operation of the blade through exactly one-half of a revolution In the accompany drawings, showing several embodiments of the invention:

Figure 1:
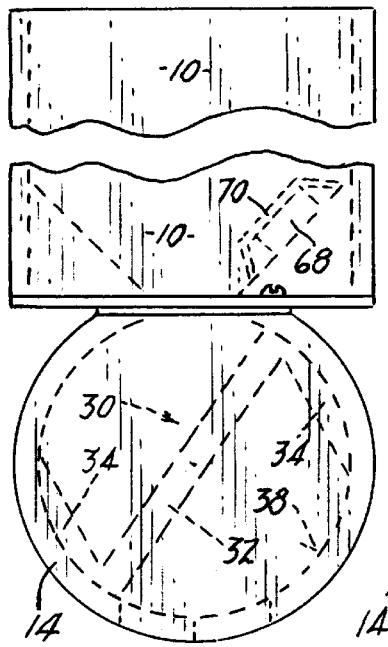
FIG. 1 is a frontal elevational view of the improved particulate dispenser of the invention, with portions of the hopper broken away to accommodate space limitations.
Figure 2:
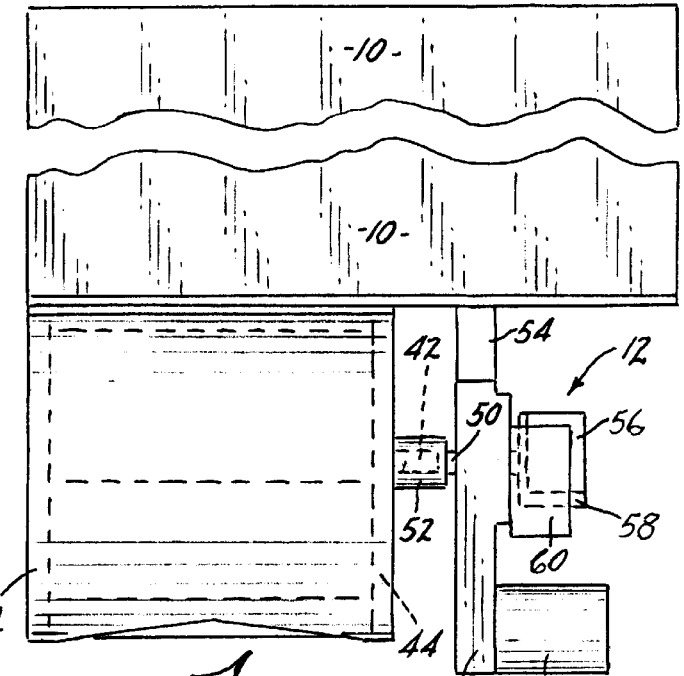
FIG. 2 is a right side elevational view of the dispenser of FIG. 1.

Referring to FIGS. 1 and 2, the improved dispenser for granular materials as provided by the invention comprises as basic parts an upright hopper 10 which can have an appreciable vertical dimension, as for example 14", a frontal dimension of about 8" in width, and a front-to-rear dimension of about 8". Below the hopper and at one side there is disposed a unique electrically powered actuator mechanism 12 that is contained in a space measureed vertically of about 4 ⅝", and at one side of the actuator mechanism 12 there is located a cylindrical dispensing chamber 14 that is roughly about 4 ¼" high and which containes a novel partition blade construction described in detail below. About 4 ⅝" measured vertically of the space below the hopper 10 is occupied by the assemblage of the electrically powered actuator 12 and dispensing chamber 14.

The hopper 10 has a flat bottom wall 16 which has a discharge opening 18 of polygonal configuration, including a wide V-shaped edge 20. Above the bottom wall 16 of the hopper 10 are sloped side walls 22, 24 and 26. At the top edge of the hopper 10 virtually all of the space enclosed by the edge is available to be filled with the granular material, as will now be understood.

The above construction results in an exceptionally compact automatic dispenser for granular materials, since the actuator 12 and dispensing chamber 14 are side by side underneath the hopper 10, each having adequate space at such location.

The discharge opening 18 at the bottom of the hopper 10 can empty into the dispensing chamber 14 under the action of gravity, and the chamber 14 has a bottom outlet 28 which can empty into an open package (not shown) placed under it by the customer or consumer.

Figure 7:
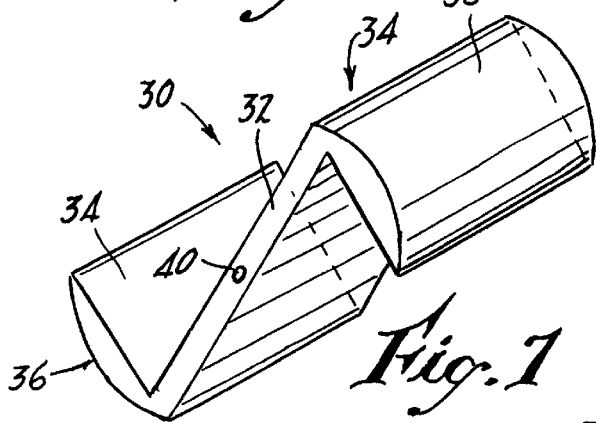
FIG. 7 is a perspective view of the novel partition blade component of the dispenser.

In accordance with the invention a novel zig-zag shaped partition blade 30 is provided in the chamber 14 for rotary movement therein. Referring to FIG. 7, the partition blade 30 is seen to have a flat central body portion 32 and a pair of angularly, oppositely extended end portions 34 which result in a reverse Z-configuration. The end portions 32 have curvilinear exterior side surfaces 36 which closely fit the cylindrical interior wall 38 of the dispensing chamber 14.

At the center of the flat-walled body portion 32 there is a through bore 40 to receive a shaft 42 which passes out through one end wall 44 of the dispensing chamber 14. Adjoining the wall 44 is the electrical actuator 12 of the vending machine.

The actuator or power means 12 comprises a miniature d. c. electric motor 46 carried by a reduction gear train 48 which has an output shaft 50 that is coupled to the shaft 42 by a coupling 52. The gear train 48 can be mounted on the hopper 10 in any suitable manner, as by a post structure 54. The output shaft 50 extends from both sides of the gear train 48, and is coupled to or carries a two-lobe cam wheel 56 having lobes 58.

On the gear train 48 there is mounted a normally open microswitch 60 having a lever 62 that is actuated twice for each revolution of the output shaft 50, thereby turning the partition blade 30 through one half of a revolution for each actuation of the switch lever 62 which closes the switch 60.

Figure 3:
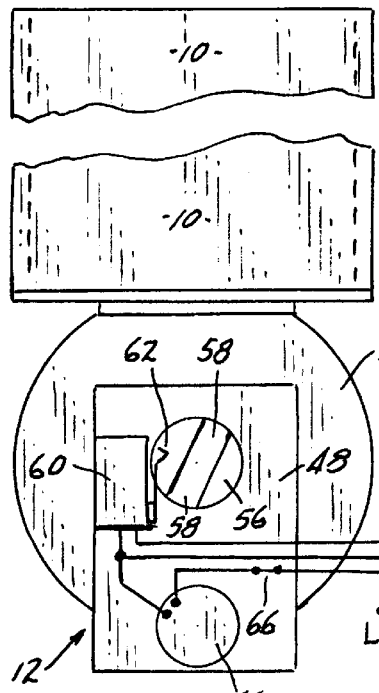
FIG. 3 is a rear elevational view of the dispenser.
Figure 4:
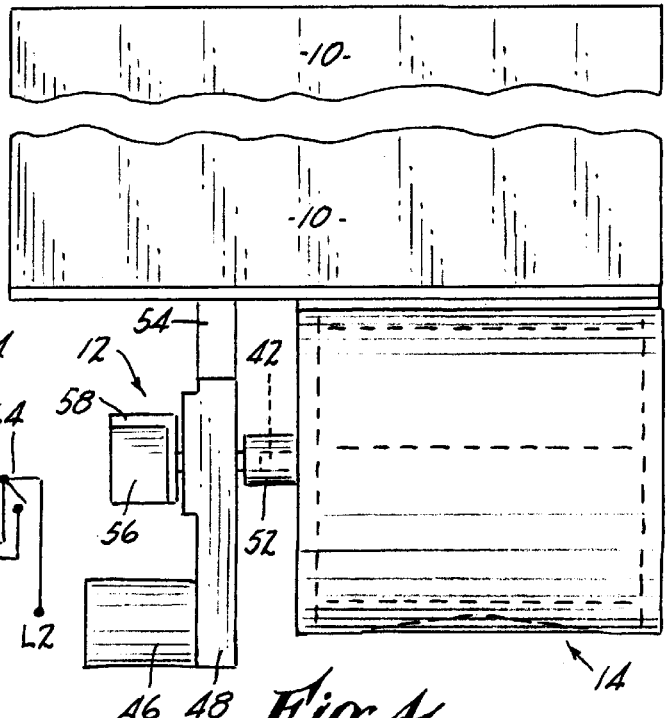
FIG. 4 is a left side elevational view of the dispenser.
Figure 5:
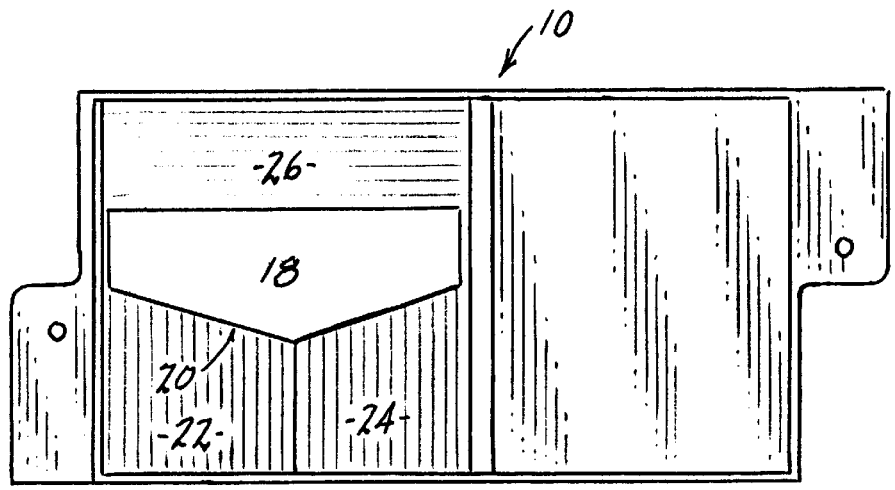
FIG. 5 is a top plan view of the dispenser.
Figure 6:
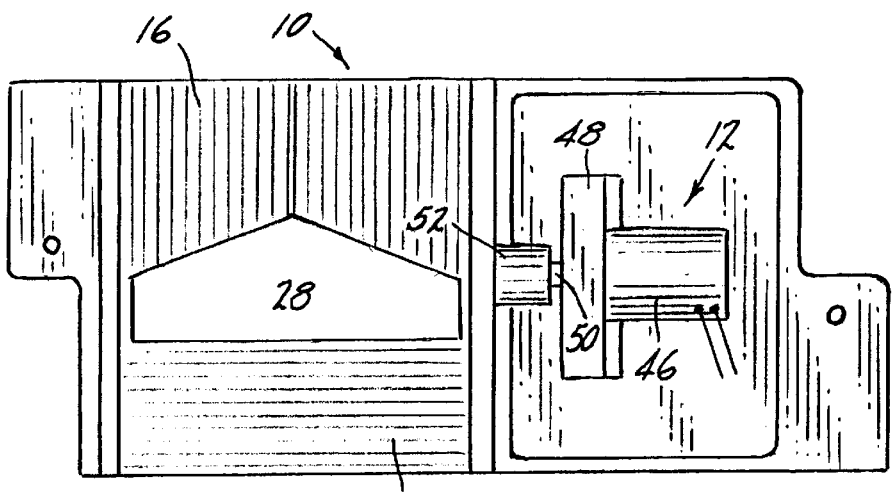
FIG. 6 is a bottom plan view of the dispenser.

The circuitry for the motor 46 is given in FIG. 3, wherein a pushbutton switch 64 which bridges the microswitch 60 can be closed to initially activate the motor 46, such activation being then sustained by the cam lobe 58 through one half revolution of the blade 30 after which the motor 46 is deenergized and the blade 30 comes to rest due to the space on opposite sides of the lobe 58 reaching the switch lever 62 and releasing the lever to thereby open the switch 60. The cam 56 and switch 60 thus constitute a device which automatically renders the power means 12 inoperative to actuate the partiton blade 30 after a predetermined initial period of operation of the power means.

From FIG. 1 it will be seen that the dispensing chamber 14 becomes half filled each time that the blade 30 goes through a one-half revolution, and that for each such activation a previously loaded one-half of the chamber 14 empties through the bottom outlet 28, where an empty package can be waiting to be filled.

In the line circuit lead L1 a pair of terminals 66 can be provided for connection to a limit sensor switch 68 having a diaphragm or feeler actuator 70 whereby the level of the granular material in the hopper 10 can be sensed. When the hopper nears the emptying point, the switch 68 can inactivate the dispensing apparatus.

Figure 8:
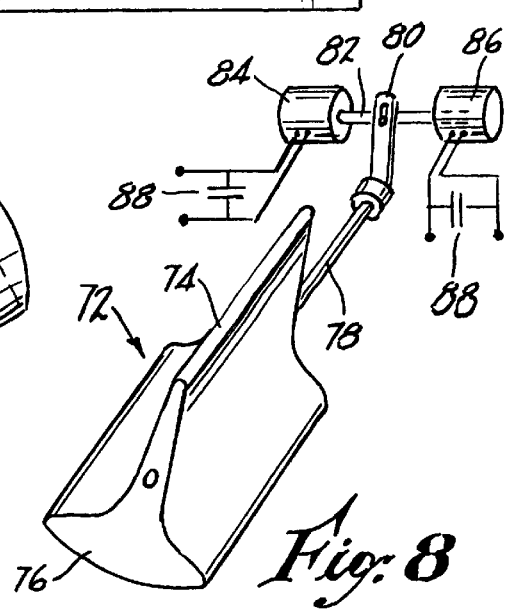
FIG. 8 is a perspective view of another embodiment of the invention, having a rocker-shaped partition blade and showing electrical circuitry for effecting reciprocative operation of such blade.

Another embodiment of the invention is illustrated in FIG. 8, wherein a partition blade 72 of different configuration can be used in the chamber 14. The blade 72 has a narrow edge 74 and a wide edge 76, and is carried by a shaft 78 having an actuating lever arm 80 that is pin-connected to a magnetic core member 82 common to two solenoids 84 and 86. The leads of the solenoids 84 and 86 are bridged by spark-suppressing capacitors 88 to minimize surges in the lines when the solenoids are deenergized.

The blade 72 divides the dispensing chamber 14 into two halves which discharge alternately, as in the case of the blade 30 of the previous embodiment of the invention.

What is claimed is:

1. A dispenser for granular materials, comprising, in combination:
   a) a hopper for holding said materials, said hopper having a bottom discharge opening,
   b) means providing a cylindrical dispensing chamber disposed below said hopper in communication with the discharge opening thereof,
   c) said dispensing chamber having a bottom outlet to empty its contents to the exterior thereof,
   d) a zig-zag shaped partition blade disposed in said dispensing chamber and turnably movable therein between two opposite operative rotative positions wherein spaces on the opposite sides of the partition blade can be alternately connected respectively with either the discharge opening of the hopper or the bottom outlet of the dispensing chamber, said partition blade having a flat body portion constituting a partition proper in the chamber, and having angularly oppositely extended end portions,
   e) said end portions having curvilinear exterior side surfaces which closely fit the cylindrical interior of the dispensing chamber, and
   f) automatically controlled electrical power means adapted to actuate said partition blade and shift the same through a partial revolution from one of said two opposite operative positions to the other operative position, thereby to enable a discharge to occur from one of the spaces located at a side of said partition blade.

2. A dispenser as set forth in claim 1, wherein said electrical power means includes a device for automatically rendering it inoperative to actuate the partition blade after a predetermined initial period of operation of the power means and travel of the partition blade through said partial revolution.

3. A dispenser as set forth in claim 1, wherein there are means for mounting and driving the partition blade, said means comprising a shaft adapted to effect rotary movement of the blade in the dispensing chamber.

4. A dispenser as set forth in claim 3, wherein there is a cam switch having a cam that is coupled to the said shaft, said cam switch being connected to said electrical means to limit each operation thereof to movement of the partition blade through said partial revolution.

5. A dispenser as set forth in claim 1, wherein:
   a) said electrical means comprises an electric motor.

6. A dispenser as set forth in claim 5, wherein:
   a) the electric motor is a low-voltage d. c. motor, and
   b) said electrical means includes a low-voltage d. c. power supply for energizing said motor.

7. A dispenser as set forth in claim 1, wherein the partition blade is turnable and symmetrical about a central axis.

8. A dispenser as set forth in claim 7, wherein:
   a) the electrical means comprises an electric motor and a gear train connected thereto,
   b) said gear train being drivingly connected to said partition blade.

9. A dispenser as set forth in claim 8, and further including:
   a) a cam switch driven by said motor and connected thereto to control the energization thereof,
   b) said cam switch having a two-lobe cam coupled to said partition blade and being adapted to actuate the cam switch once for each one-half revolution of turning of the partition blade.

10. A dispenser for granular materials, comprising, in combination:
    a) a hopper for holding said materials, said hopper having a bottom discharge opening, b) means providing a cylindrical dispensing chamber disposed below said hopper in communication with the discharge opening thereof, c) said dispensing chamber having a bottom outlet to empty its contents to the exterior thereof, d) a zig-zag shaped partition blade disposed in said dispensing chamber and movable therein between two operative positions wherein spaces on the opposite sides of the partition blade can be alternately connected respectively with either the discharge opening of the hopper or the bottom outlet of the dispensing chamber, said partition blade having a flat body portion constituting a partition proper in the chamber, and having angularly oppositely extended end portions, e) said end portions having curvilinear exterior side surfaces which closely fit the cylindrical interior of the dispensing chamber, f) electrical means for actuating said partition blade to shift the same between the said operative positions, thereby to effect a filling and discharge respectively of the spaces at the opposite sides of said partition blade, g) the means mounting the partition blade providing for rotary movement of the same in the dispensing chamber and comprising a shaft on which the partition blade is carried, and h) a cam switch operated by the cam on the said shaft and connected to said electrical means to control the operation thereof.

11. A dispenser as set forth in claim 10, wherein said cam switch comprises a double-lobe cam to effect operation of the said switch twice for each complete revolution of the shaft.

12. A dispenser for granular materials, comprising, in combination:

a) a hopper for holding said materials, said hopper having a bottom discharge opening, b) means providing a cylindrical dispensing chamber disposed below said hopper in communication with the discharge opening thereof, c) said dispensing chamber having a bottom outlet to empty its contents to the exterior thereof, d) a zig-zag shaped partition blade disposed in said dispensing chamber and movable therein between two operative positions wherein spaces on the opposite sides of the partition blade can be alternately connected respectively with either the discharge opening of the hopper or the bottom outlet of the dispensing chamber, said partition blade having a flat body portion constituting a partition proper in the chamber, and having angularly oppositely extended end portions, e) said end portions having curvilinear exterior side surfaces which closely fit the cylindrical interior of the dispensing chamber, f) electrical means for actuating said partition blade to shift the same between the said operative positions, thereby to effect a filling and discharge respectively of the spaces at the opposite sides of said partition blade, g) said partition blade being turnable and symmetrical about a central axis, h) said electrical means comprising an electric motor and a gear train connected thereto, i) said gear train being drivingly connected to said partition blade, and j) a cam switch driven by said motor and connected thereto to control the energization thereof, k) said cam switch including a two-lobe cam on the shaft to actuate the cam switch once for each one-half revolution of turning of the partition blade.

13. A dispenser for granular materials, comprising, in combination:

a) a hopper for holding said materials, said hopper having a bottom discharge opening, b) means providing a dispensing chamber having a cylindrical interior surface disposed below said hopper in communication with the discharge opening thereof, c) said dispensing chamber having a bottom outlet to empty its contents to the exterior thereof d) a swingable partition blade having a pair of opposite, wide and narrow edges and having an axis intermediate its said edges, said partition blade being movable in the dispensing chamber between two operative positions wherein spaces on the opposite sides of the partition blade can be alternately connected respectively with either the discharge opening of the hopper or the bottom outlet of the dispensing chamber, said opposite edges being in contact with the cylindrical interior surface of the dispensing chamber, and f) electrical means comprising a reciprocatable device connected to the partition blade to actuate the same between its said two operative positions.

14. A dispenser as set forth in claim 13, wherein:

a) said reciprocative device comprises electrical solenoids.

15. A dispenser as set forth in claim 14, wherein:

a) spark suppressor means are connected to said solenoids to reduce the propagation of electrical surges therefrom.

* * * * *